US010586008B2

(12) United States Patent
Chakraborty et al.

(10) Patent No.: US 10,586,008 B2
(45) Date of Patent: Mar. 10, 2020

(54) REMOVAL OF ARTIFICIAL RESONANCES USING BOUNDARY ELEMENT METHOD

(71) Applicant: Mentor Graphics Corporation, Wilsonville, OR (US)

(72) Inventors: Swagato Chakraborty, Fremont, CA (US); James Pingenot, New York, NY (US); Mosin Mondal, Noida (IN)

(73) Assignee: Mentor Graphics Corporation, Wilsonville, OR (US)

( * ) Notice: Subject to any disclaimer, the term of this patent is extended or adjusted under 35 U.S.C. 154(b) by 57 days.

(21) Appl. No.: 15/789,719

(22) Filed: Oct. 20, 2017

(65) Prior Publication Data

US 2018/0113971 A1 Apr. 26, 2018

Related U.S. Application Data

(60) Provisional application No. 62/411,419, filed on Oct. 21, 2016.

(51) Int. Cl.
G06F 17/50 (2006.01)

(52) U.S. Cl.
CPC ...... *G06F 17/5068* (2013.01); *G06F 17/5018* (2013.01); *G06F 2217/16* (2013.01)

(58) Field of Classification Search
CPC .............. G06F 17/5009–5036; G06F 2217/16
See application file for complete search history.

*Primary Examiner* — Jack Chiang
*Assistant Examiner* — Aric Lin
(74) *Attorney, Agent, or Firm* — Mentor Graphics Corporation (57) ABSTRACT

This application discloses a computing system configured to crop a layout design for an electronic device implemented with a layered interconnect, place a termination structure corresponding to a resistive sheet or a set of resistive components on an artificial boundary corresponding to an edge in the cropped portion of the layout design, and generate an electrical model of a signaling net in the cropped portion of the layout design by generating mesh elements on a surface area of the cropped portion of the layout design including the termination structure and utilizing a field solver implementing a Boundary Element Method based analysis to solve integral forms of Maxwell's equations corresponding to the mesh elements. The electrical model of the signaling net in the cropped portion of the layout design can include a set of scattering parameters for the signaling net in the cropped portion of the layout design.

20 Claims, 7 Drawing Sheets

PROFILE VIEW OF CROPPED LAYOUT DESIGN

FIG. 4B

SIDE VIEW OF CROPPED LAYOUT DESIGN

REMOVAL OF ARTIFICIAL RESONANCES USING BOUNDARY ELEMENT METHOD

RELATED APPLICATION

This patent application claims priority to U.S. Provisional Patent Application No. 62/411,419, filed Oct. 21, 2016, which is incorporated by reference herein.

TECHNICAL FIELD

This application is generally related to electronic design automation and, more specifically, to signaling net modeling in layout designs having layered interconnects utilizing boundary element method with a removal of artificial resonances.

BACKGROUND

The development of electronic devices with layered interconnects, such as printed circuit boards or integrated circuit packages, usually involves many steps, known as a design flow. This design flow typically starts with a specification for a new circuit to be implemented with a layered interconnect. The specification of the new circuit can be transformed into a circuit design, such as a netlist, for example, by a schematic capture tool or by synthesizing a logical circuit design, sometimes referred to as a register transfer level (RTL) description of the circuit. The netlist, commonly specified in an Electronic Digital Exchange Format (EDIF), can describe nets or connectivity between various devices or instances in the circuit design.

The design flow continues by verifying functionality of the circuit design, for example, by simulating or emulating the circuit design and verifying that the results of the simulation or emulation correspond with an expected output from the circuit design. The functionality also can be verified by statically checking the circuit design for various attributes that may be problematic during operation of an electronic device built utilizing the circuit design.

Once the circuit design has been functionally verified, the design flow continues to design layout and routing, which includes placing and interconnecting various components into a representation of a layered interconnect in order to generate a layout design of the electronic device implemented in the layered interconnect. This procedure can be implemented in many different ways, but typically, through the use of a layout tool, which can present at least one graphical view of the layered interconnect and allow a designer to drag or place parts from a library onto the layered interconnect.

After generation of the layout design of the electronic device implemented with the layered interconnect, the design flow can verify the layout design of the electronic device implemented with the layered interconnect. Some layout verification analysis includes an evaluation of signal integrity on signaling nets in the layout design. Typically, the signaling nets in the layout design can be converted into an electrical model, such as scattering parameters (S-Parameters), which can subsequently be utilized to evaluate the signal integrity on the signaling nets in the layout design.

Due to the size and complexity of the modern layout designs, conversions of the signaling nets in the layout design into the electrical models typically utilize a divide-and-conquer methodologies, for example, in which smaller via transition regions can be analyzed by a computationally-expensive three-dimensional field solver and the much larger routing areas can be analyzed using cascaded transmission line models. These divide-and-conquer methodologies crop out portions of the layout design and generate electrical models for each cropped portion.

The divide-and-conquer methodologies can implement a mesh generation process to generate mesh elements for surface areas of each of the cropped portion of the layout design. The mesh elements can correspond to geometric shapes, such as rectangles, squares, triangles, or the like, on the surface area of the cropped portion of the layout design. The divide-and-conquer methodologies often utilize field solvers, for example, implementing a finite element method (FEM) analysis or a finite difference time-domain (FDTD) analysis to generate the electrical model for the signaling nets in the layout design by solving differential forms of Maxwell's equations.

Since the divide-and-conquer methodologies crop the layout design, the field solvers can generate an electrical model for a cropped portion of signaling nets in the layout design that includes artificial reflection arising from the cropped planes implementing the signaling nets. In other words, the field solvers generate the electrical model as if the signaling plane was actually severed where the divide-and-conquer methodologies cropped it. The field solvers implementing FEM-based analysis or FDTD-based analysis often truncate open or unbounded areas in order simplify the differential forms of Maxwell's equations to be solved, for example, by utilizing techniques, such as an absorbing boundary condition (ABC), a perfectly matched layer (PML), or lossy padding, so the divide-and-conquer methodologies utilizing field solvers implementing FEM-based analysis or FDTD-based analysis typically add absorbent materials outside of the cropped edges of the signaling nets being analyzed. The utilization of these absorbent materials, however, is complicated, time-consuming and resource-intensive as well as less amenable to automation due to the difficulty in eliminating geometrical conflicts with existing signaling net planes in the layered interconnect.

SUMMARY

This application discloses a computing system implementing a signaling net modeling tool to generate an electrical model of signaling nets in a layout design for an electronic device implemented with a layered interconnect, such as a printed circuit board, an integrated circuit package, or the like. The signaling net modeling tool can implement a divide-and-conquer methodology, which can crop different portions of a layout design for an electronic device implemented with a layered interconnect and generate electrical models for the different portions of the layout design utilizing a field solver implementing a Boundary Element Method (BEM) based analysis to solve integral forms of Maxwell's equations. The electrical model of the signaling net in the cropped portion of the layout design can include a set of scattering parameters (S-Parameters) for the signaling net in the cropped portion of the layout design.

Since the cropping of the signal nets in the layout design can create an artificial boundary that can introduce signal reflections, the signaling net modeling tool can generate a termination structure, such as a resistive sheet or a set of resistive components, which can have an impedance corresponding to the characteristic impedance for a parallel-plate waveguide associated with dielectric materials disposed between planes in the layered interconnect. The signaling net modeling tool can place the termination structure on the artificial boundary corresponding to an edge in the cropped portion of the layout design. Since the artificial boundary with the termination structure can have an impedance matching (or approximately matching) with the characteristic impedance of the parallel-plate waveguide, the artificial boundary with the termination structure can remove signal reflections back into the cropped portion of the layout design.

The signaling net modeling tool can generate mesh elements on a surface area of the cropped portion of the layout design including the termination structure, which can include creating integral forms of Maxwell's equations for the mesh elements. The signaling net modeling tool can generate the electrical model of the signaling net in the cropped portion of the layout design by utilizing a field solver implementing a Boundary Element Method (BEM) based analysis to solve integral forms of Maxwell's equations corresponding to the mesh elements. In some embodiments, the field solver implementing a Boundary Element Method (BEM) based analysis can be a three-dimensional (3D) field solver or a hybrid field solver combining a BEM based plane model and transmission line regions. Embodiments will be described in greater detail below.

DETAILED DESCRIPTION

Illustrative Operating Environment

Figure 1:
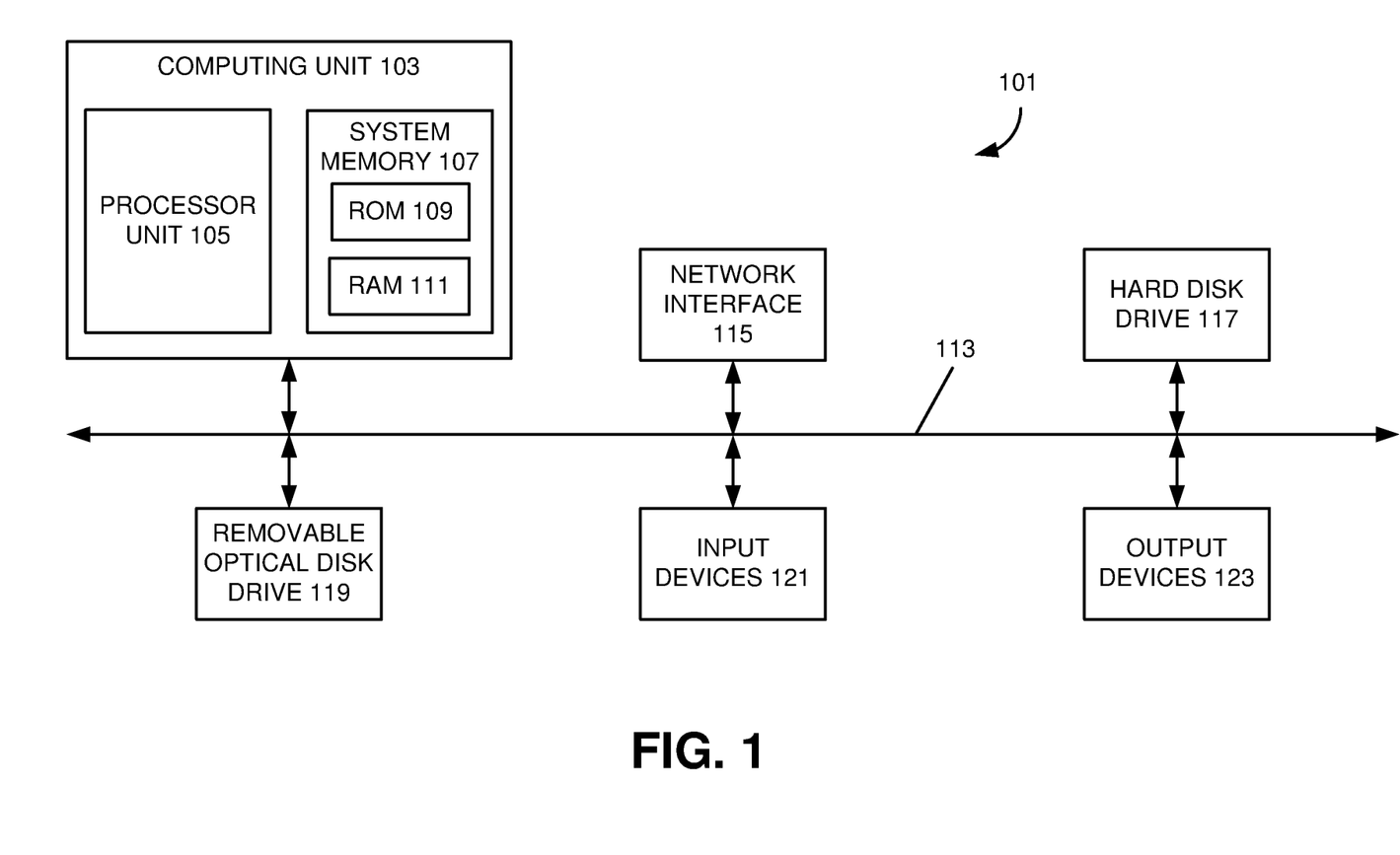
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
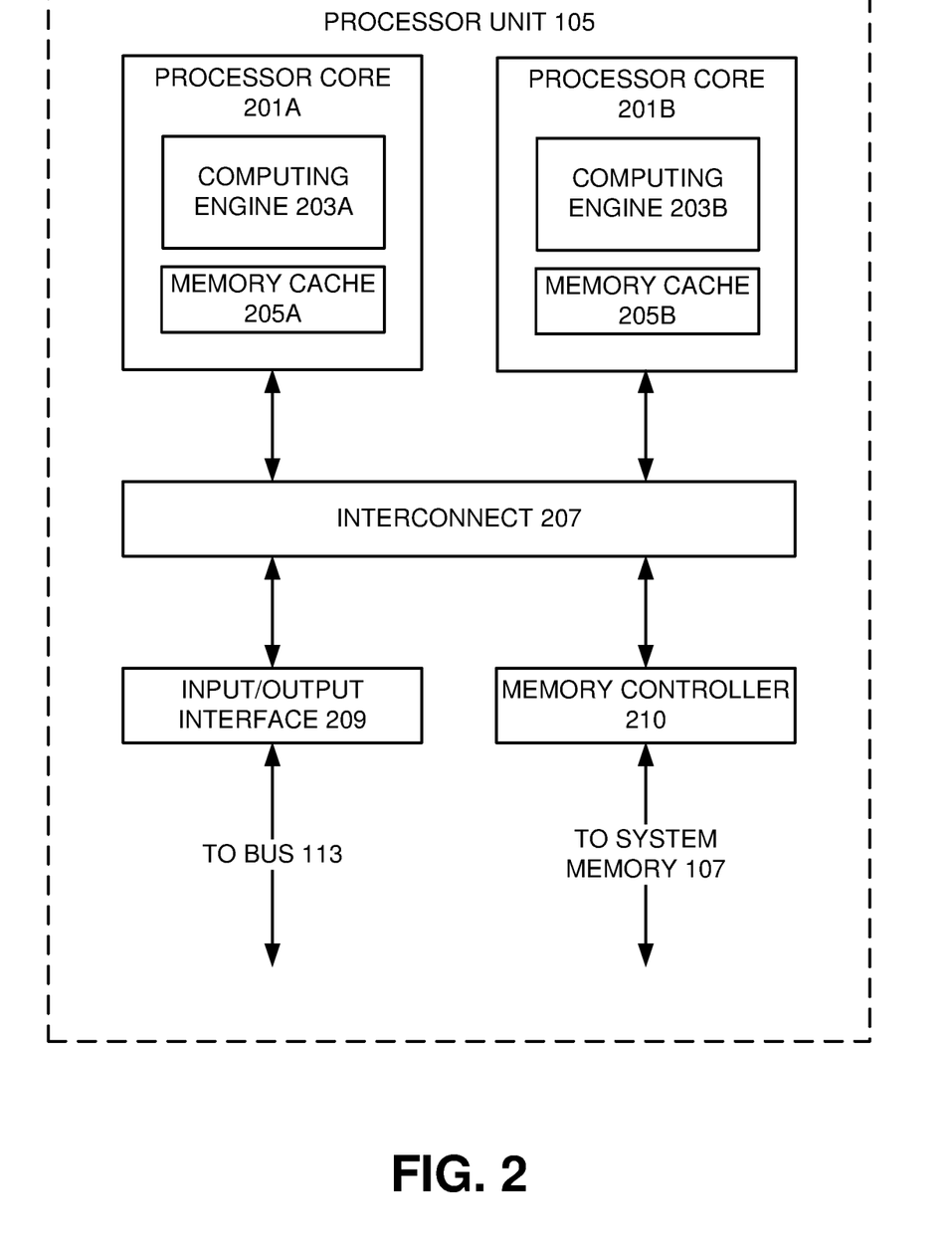

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Removal of Artificial Resonances Using Boundary Element Method (BEM)

Figure 3:
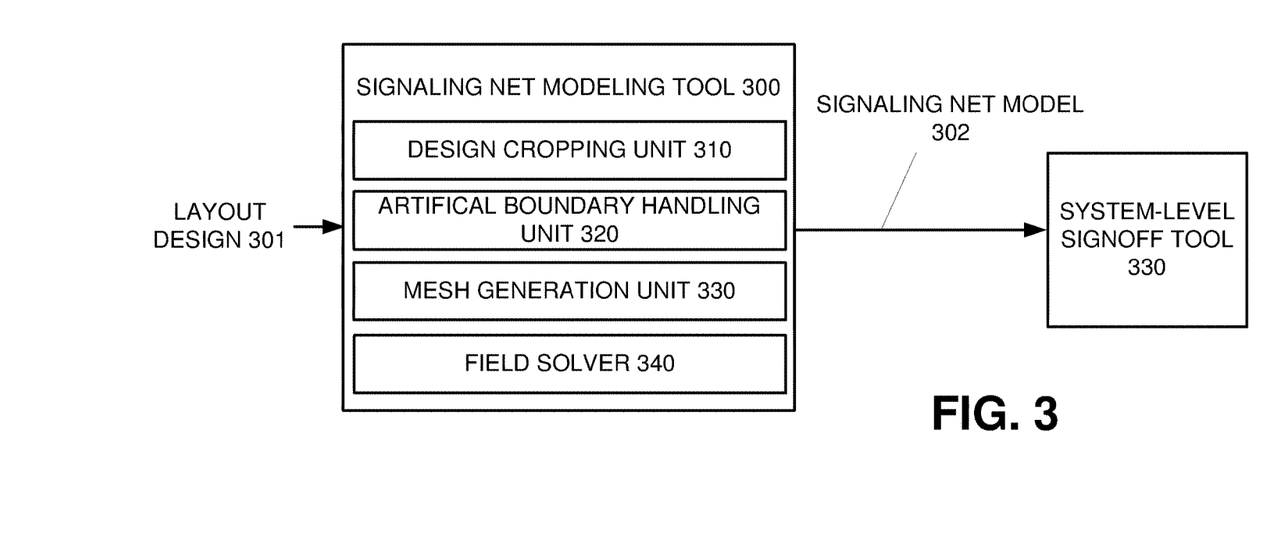
FIG. 3 illustrates an example of a signaling net modeling tool to generate electrical models of signaling nets in a layout design of an electronic device implemented with a layered interconnect according to various embodiments.

FIG. 3 illustrates an example of a signaling net modeling tool 300 to generate electrical models of signaling nets in a layout design 301 of an electronic device implemented with a layered interconnect according to various embodiments. Referring to FIG. 3, the signaling net modeling tool 300 can receive the layout design 301 describing the electronic device for a product in terms of various components placed and interconnected on the layered interconnect, such as a printed circuit board, an integrated circuit package, or the like. The layout design 301 also can describe signaling nets in the layout design 301, such as signal networks or power distribution networks in the electronic device, which can include multiple planes, wires, and associated vias in the layered interconnect. In some embodiments, the vias can correspond to electrical connections between layers in the layered interconnect, for example, connecting a plane or a wire on one layer of the layered interconnect to a plane or wire on another layer of the layered interconnect. The layout design 301 can be specified in an Open Database++ (ODB++) format, an Alegro format, a CCE file extension format, or the like. In some embodiments, the signaling net modeling tool 300 can receive the layout design 301 from a source external to the signaling net modeling tool 300, such as a user interface of the computing device 101, another tool implemented by the computing device 101, or the signaling net modeling tool 300 may internally generate the layout design 301.

The signaling net modeling tool 300 can model at least one of the signaling nets in the layout design 301, which the signaling net modeling tool 300 can output to a system-level signoff tool 330 as a signaling net model 302. The signaling net model 302 can describe the electrical behavior of the signaling net, for example, as a set of scattering parameters (S-Parameters) or the like. The system-level signoff tool 330 can utilize the signaling net model 302 to evaluate the signaling net in the layout design 301, for example, determine a signal integrity on the signaling net in the electronic device described by the layout design 301.

The signaling net modeling tool 300 can generate the signal net model 302 using a divide-and-conquer approach, which separately models at least a portion of a signaling net in different portions of the layout design. The signaling net modeling tool 300 can include a design cropping unit 310 to crop the layout design 301, which can identify a portion of the layout design 301 to perform the signal net modeling. The design cropping unit 310 can identify an artificial boundary created by the cropping operation. For example, when the design cropping unit 310 performs a cropping operation on the layout design 301, which severed a signaling net or power planes in the layout design, the design cropping unit 310 can utilize the severed edge of the signaling net or the power place to identify the artificial boundary.

In some embodiments, the design cropping unit 310 can perform multiple successive cropping operations on the layout design 301 to identify the cropped portion of the layout design 301 to perform signal net modeling. The design cropping unit 310 can track the severed edges or artificial boundaries created during the successive cropping operations. Embodiments of layout design cropping and artificial boundary identification will be described below with reference to FIGS. 4A-4C.

Figure 4A:
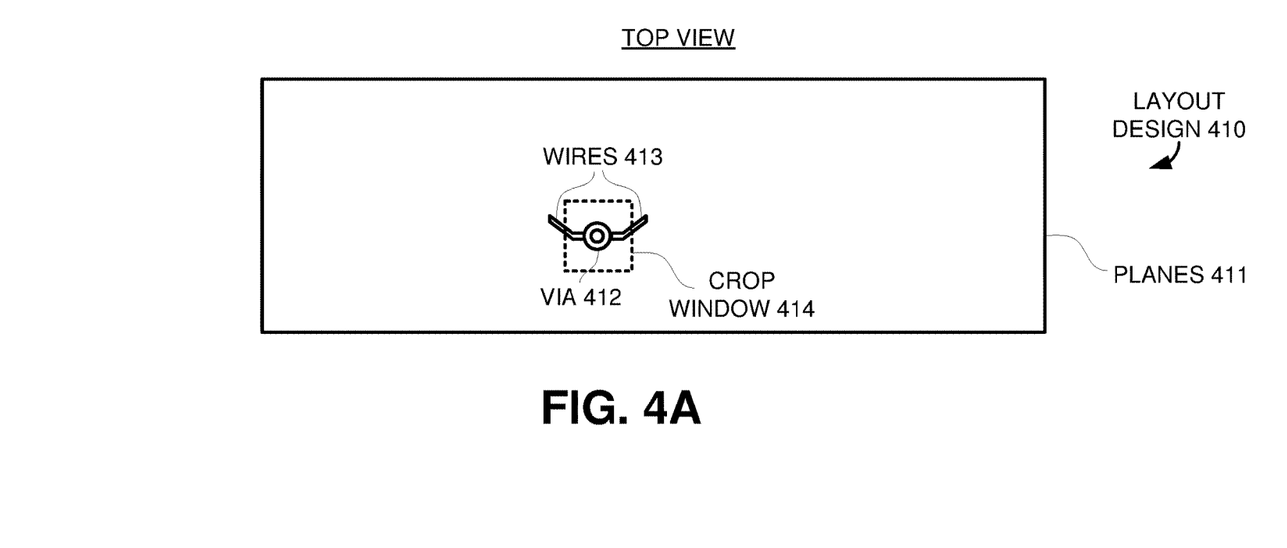
FIGS. 4A-4C illustrate an example cropping of a layout design, which creates artificial boundaries for signal nets in the layout design according to various examples.
Figure 4B:
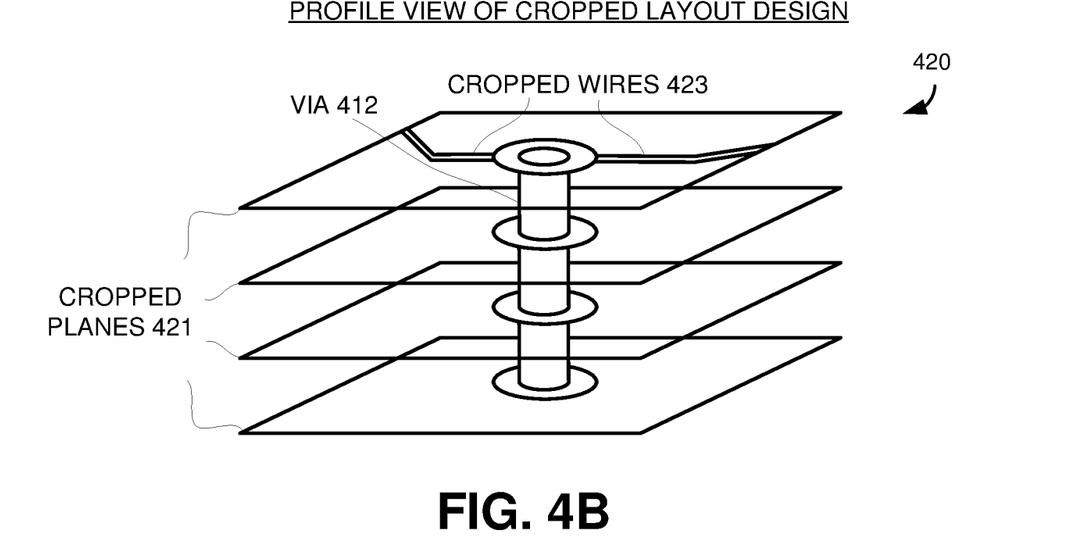
Figure 4C:
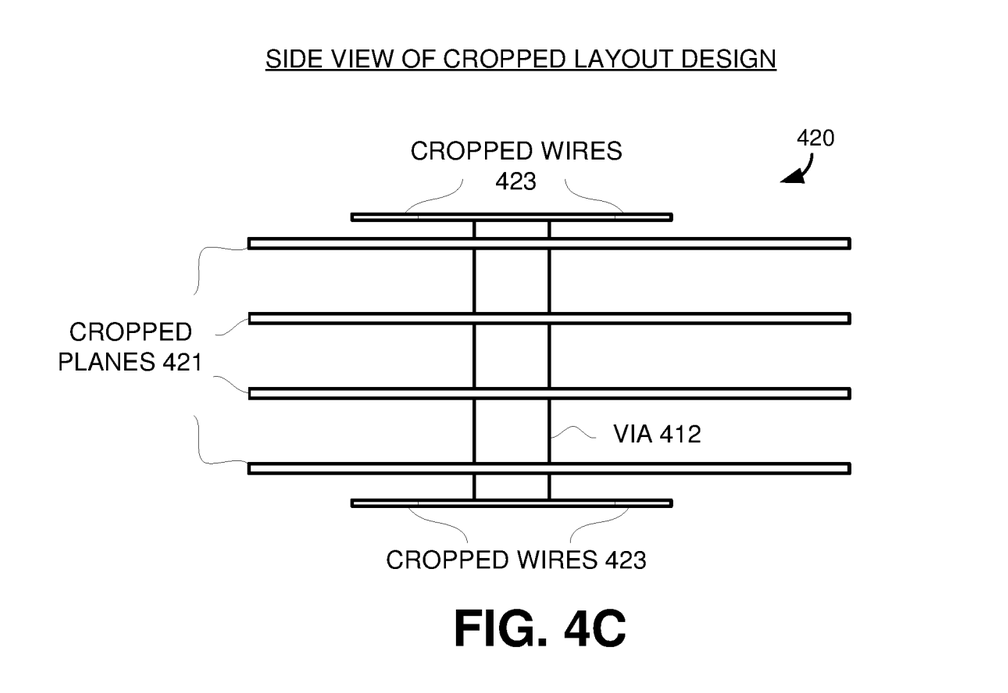

FIGS. 4A-4C illustrate an example cropping of a layout design 410, which creates artificial boundaries for signal nets in the layout design according to various examples. Referring to FIG. 4A, the layout design 410 can describe an electronic device implemented with a layered interconnect that includes planes 411, vias 412, and wires 413 to route signals in different signal nets and power in at least one power distribution network on different layers in the electronic device.

During cropping operations, such as when implementing a divide-and-conquer methodology in electronic modeling of a signaling net in the layout design 410, a signal net modeling tool can set a crop window 414 to crop the via 412 and portions of the planes 411 and the wires 413 from the layout design 410. The cropping of the layout design 410 can generate artificial boundaries for the planes 411, the wires 413, and dielectric materials disposed between the layers of the layered interconnect, which may in conjunction with the planes 411 correspond to parallel-plate waveguides.

Referring to FIGS. 4B and 4C, a cropped layout design 420 is shown in both a profile view and a side view. The cropped layout design 420 can include portions of a signaling net, such as the via 412 from the layout design 410 in FIG. 4A as well as cropped planes 421 and cropped wires 423. The cropped layout design 420 can have artificial boundaries corresponding to the edges of the planes 411, the wires 413, and dielectric materials disposed between the layers of the layered interconnect that were created during the cropping operations. The artificial boundaries may have impedances that differ from the characteristic impedance associated with the parallel-plate waveguides, which can induce artificial reflections from the artificial boundaries back through the parallel-plate waveguides onto the signaling net in the cropped layout design 420 and included in an electrical model of the signaling net. For example, signals traveling through the via 412 can induce radial waves, which emanate from the via 412 through the parallel-plate waveguides. Without artificial boundary handling—which will be described below in greater detail—when the radial waves encounter an artificial boundary in the cropped layout design 420, the radial waves could reflect back through the parallel-plate waveguides to the via 412 and corrupt an electrical model of a signaling net including the via 412 in the cropped layout design 420.

Referring back to FIG. 3, the signaling net modeling tool 300 can include an artificial boundary handling unit 320 to determine a characteristic impedance for a parallel-plate waveguide having an artificial boundary in the cropped portion of the layout design 301 created by the design cropping unit 310. Since an impedance mismatch at the artificial boundary can cause signal reflections back through the parallel-plate waveguide onto the signaling net, the artificial boundary handling unit 320 can generate a termination structure for placement on the artificial boundary based, at least in part, on the characteristic impedance associated with the parallel-plate waveguide. The termination structure can represent a dielectric interface for the cropped portion of the layout design 301, which can have an impedance approximately matching the characteristic impedance for the parallel-plate waveguide to reduce or eliminate signal reflections back onto the signaling net due to the presence of the artificial boundary.

The artificial boundary handling unit 320, in some embodiments, can generate multiple different types of termination structures based on a type of field solver the signaling net modeling tool 300 utilizes to generate the signaling net model 302. For example, when the signaling net modeling tool 300 utilizes a three-dimensional (3D) full-wave field solver implementing a Boundary Element Method (BEM) based analysis to generate the signaling net model 302, the artificial boundary handling unit 320 can generate a resistive sheet as the termination structure for placement on the artificial boundary. Embodiments of resistive sheet generation and placement will be described below with reference to FIGS. 5A-5C.

When the signaling net modeling tool 300 utilizes a hybrid field solver to generate the signaling net model 302, the artificial boundary handling unit 320 can generate a set of discrete resistive components as the termination structure for placement on the artificial boundary. In some embodiments, the hybrid field solver can combine a two-dimensional field solver implementing a BEM based plane model and a field solver implementing transmission line analysis. Embodiments of discrete resistive component generation and placement will be described below with reference to FIGS. 6A-6C.

Figure 5A:
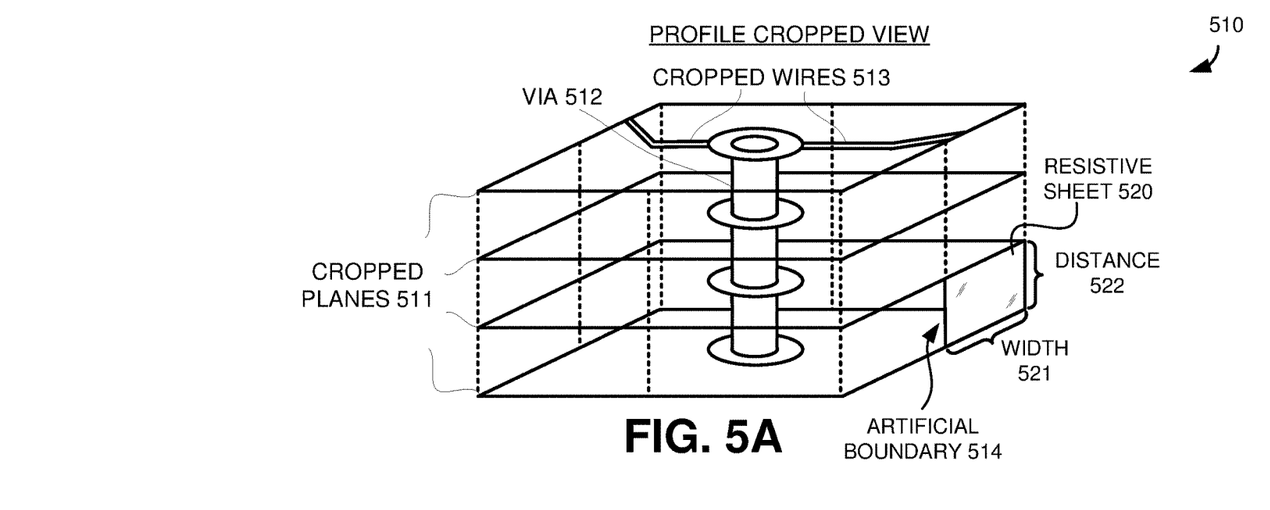
FIGS. 5A-5C illustrate an example a termination structure placed on an artificial boundary of a cropped portion of a layout design for utilization by a three-dimensional (3D) full wave solver utilizing a boundary element method (BEM) according to various examples.
Figure 5B:
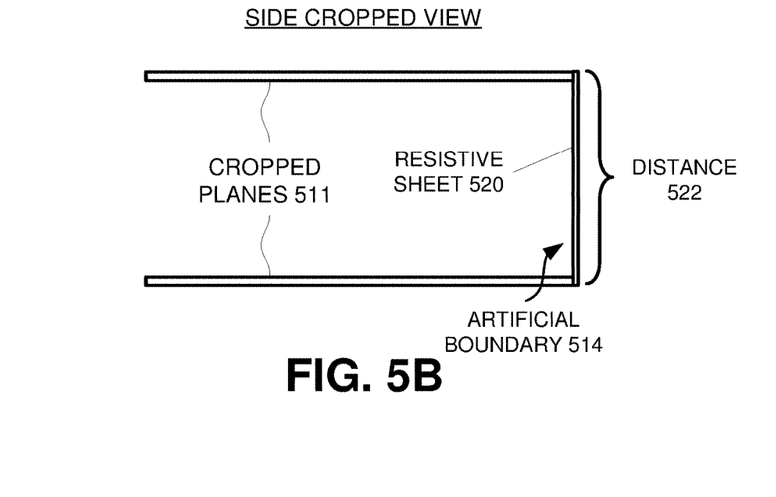
Figure 5C:
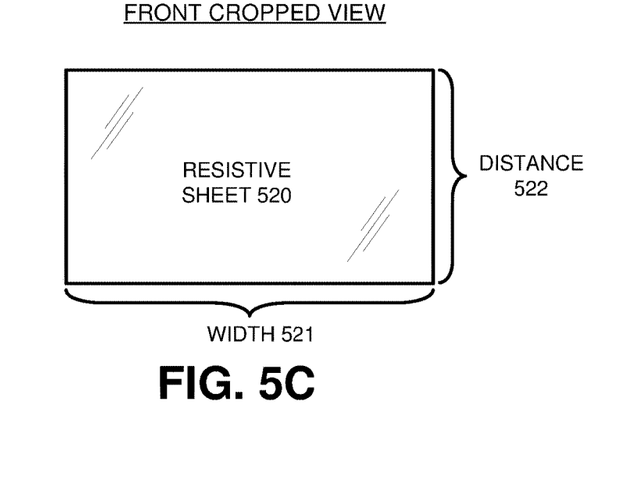

FIGS. 5A-5C illustrate an example resistive sheet 520 placed on an artificial boundary 514 of a cropped portion of a layout design 510 for utilization by a three-dimensional (3D) full wave solver utilizing a boundary element method (BEM) according to various examples. Referring to FIGS. 5A-5C, the cropped layout design 510 is shown in a profile view, a side view, and a front view. The cropped layout design 510 can include portions of a signaling net, such as the via 512 from a layout design as well as cropped planes 511 and cropped wires 513. The cropped layout design 510 can have artificial boundaries, such as artificial boundary 514, corresponding to the edges of the planes 511, the wires 513, and dielectric materials disposed between the layers of the layered interconnect that were created during cropping operations.

The artificial boundary 514 may delineate a transition between the characteristic impedance of a parallel-plate waveguide associated with the dielectric materials disposed between a pair of the planes 511 and an external impedance. For example, signals traveling through the via 512 can induce radial waves, which emanate from the via 512 towards the artificial boundary 514 through the dielectric materials disposed between the layers of the layered interconnect. When the artificial boundary corresponds to a location having an impedance mismatch, i.e., a difference between the characteristic impedance and the external impedance, the signals could artificially reflect back onto the signaling net in the cropped layout design 510.

The cropped layout design 510 can include the resistive sheet 520 placed on the artificial boundary 514, which can act as a termination structure for the cropped layout design 510. The resistive sheet 520 can have an impedance that can approximately match the characteristic impedance of the parallel-plate waveguide associated with the dielectric materials disposed between a pair of the planes 511. Since the resistive sheet 520 has an impedance that approximately matches the characteristic impedance, the addition of the resistive sheet 520 can eliminate or reduce artificial reflections of signals back onto the signaling net in the cropped layout design 510. Although FIG. 5A shows a single resistive sheet being placed on one of the artificial boundaries, i.e., the artificial boundary 514, in some embodiments, the other artificial boundaries in the cropped layout design 510 can also have termination structures placed on them.

In some embodiments, a signaling net modeling tool can generate the resistive sheet 520 to approximately match the characteristic impedance based, at least in part, on the dimensions of the artificial boundary 514. For example, an equation 1 below shows a relationship between the characteristic impedance and the dimensions of the artificial boundary 514.

$$Z_0 = R_s \frac{d}{w} \qquad \text{Equation 1}$$

In equation 1, the characteristic impedance $Z_0$ can be equal to a resistance $R_s$ of the resistive sheet 520 multiplied by a ratio of distance d or height of the artificial boundary 514 to the width w of the artificial boundary 514. The resistance $R_s$ of the resistive sheet 520 can be specified according to equation 2.

$$R_s = \frac{1}{\sigma \delta} = \frac{1}{\pi f \varepsilon_0 \varepsilon_r \delta} \qquad \text{Equation 2}$$

In equation 2, the resistance $R_s$ of the resistive sheet 520 can be equal to one divided by a product of a bulk conductivity $\sigma$ of an alternating current (AC) resistance of the resistive sheet 520 and a skin depth $\delta$ of the resistive sheet 520. Since the bulk conductivity $\sigma$ of the resistive sheet 520 can be dependent on signal frequency f, the bulk conductivity $\sigma$ of the resistive sheet 520 can be substituted with a product of pi $\pi$, a signal frequency f, a permittivity of free space $\varepsilon_0$, and a dielectric constant $\varepsilon_r$. Thus, the signaling net modeling tool can utilize a distance 522 of the artificial boundary 514 and a width 521 of the artificial boundary 514 to generate the resistive sheet 520 that approximately matches the characteristic impedance associated and can have a resistance dependent on a frequency of signals reaching the resistive sheet 520.

Figure 6A:
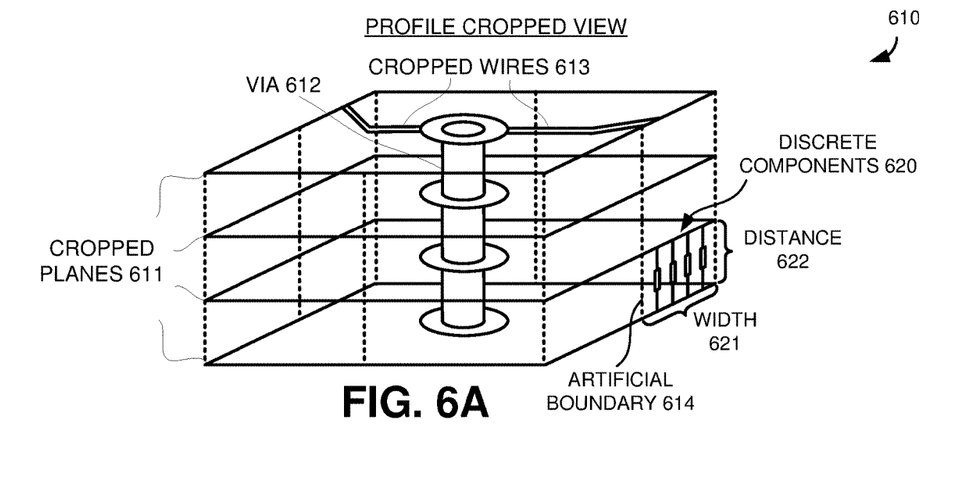
FIGS. 6A-6C illustrate an example a termination structure placed on an artificial boundary of a cropped portion of a layout design for utilization by a hybrid solver utilizing a boundary element method (BEM) according to various examples.
Figure 6B:
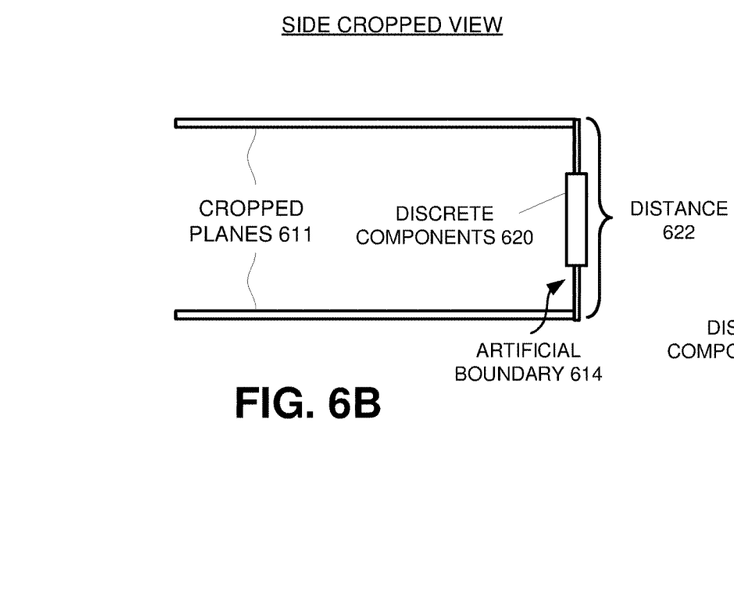
Figure 6C:
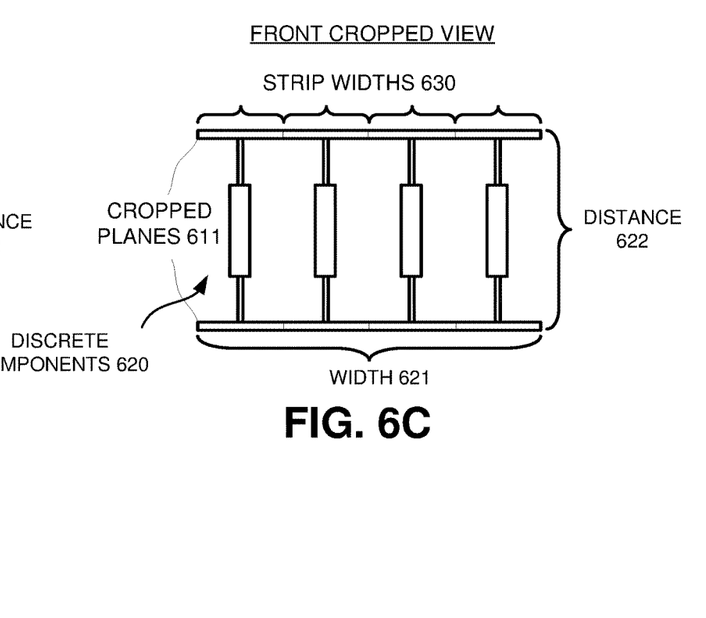

FIGS. 6A-6C illustrate an example a termination structure placed on an artificial boundary of a cropped portion of a layout design for utilization by a hybrid solver utilizing a boundary element method (BEM) according to various examples. Referring to FIGS. 6A-6C, the cropped layout design 610 is shown in a profile view, a side view, and a front view. The cropped layout design 610 can include portions of a signaling net, such as the via 612 from a layout design as well as cropped planes 611 and cropped wires 613. The cropped layout design 610 can have artificial boundaries, such as artificial boundary 614, corresponding to the edges of the planes 611, the wires 613, and dielectric materials disposed between the layers of the layered interconnect that were created during cropping operations.

The artificial boundary 614 may delineate a transition between the characteristic impedance of a parallel-plate waveguide associated with the dielectric materials disposed between a pair of the planes 511 and an external impedance. For example, signals traveling through the via 612 can induce radial waves, which emanate from the via 612 towards the artificial boundary 614 through the dielectric materials disposed between the layers of the layered interconnect. When the artificial boundary corresponds to a location having an impedance mismatch, i.e., a difference between the characteristic impedance and the external impedance, the signals could artificially reflect back onto the signaling net in the cropped layout design 610.

The cropped layout design 610 can include a set of discrete resistive components 620 placed on the artificial boundary 614, which can act as a termination structure for the cropped layout design 610. The set of discrete resistive components 620 can have an impedance that can approximately match the characteristic impedance of the parallel-plate waveguide associated with the dielectric materials disposed between a pair of the planes 511. Since the set of discrete resistive components 620 has an impedance that approximately matches the characteristic impedance, the addition of the set of discrete resistive components 620 can eliminate or reduce artificial reflections of signals back onto the signaling net in the cropped layout design 610. Although FIG. 6A shows a single set of discrete resistive components 620 being placed on one of the artificial boundaries, i.e., the artificial boundary 614, in some embodiments, the other artificial boundaries in the cropped layout design 610 can also have termination structures placed on them.

A signaling net modeling tool can generate the set of discrete resistive components 620 to approximately match the characteristic impedance associated with the artificial boundary 614 based, at least in part, on the dimensions of the artificial boundary 614. In some embodiments, the signaling net modeling tool can divide the cropped planes 611 into multiple strips perpendicular to an edge of the artificial boundary 614 and then apply equation 1 above to determine resistances $R_s$ of each discrete resistive component 620 for each strip based on a distance 622 between the cropped planes and a strip width 630.

Referring back to FIG. 3, the signaling net modeling tool 300 can include a mesh generation unit 330 to generate mesh elements for surface areas of each of the cropped portion of the layout design as well as the termination structures generated by the artificial boundary handling unit 320. This generation of the mesh elements can decompose the surface area of the cropped portion of the layout design into regular subsections, such as triangles, quadrilateral elements, or the like, to represent the surface area. The mesh elements can correspond to geometric shapes, such as rectangles, squares, triangles, or the like, on the surface area of the cropped portion of the layout design and the termination structures generated by the artificial boundary handling unit 320. In some embodiments, volume mesh elements can correspond to shapes, such as tetrahedrons, hexahedrons, or the like, which can represent volume of the cropped portion of the layout design. The mesh generation unit 330 also can generate integral forms of Maxwell's equations for each mesh element or for each edge between the mesh elements.

The signaling net modeling tool 300 can include a field solver 340 to generate electrical model of a signaling net in the cropped portion of the layout design, such as the signaling net model 302, by solving the integral forms of Maxwell's equations corresponding to the mesh elements utilizing a Boundary Element Method (BEM) based analysis. In some embodiments, the field solver 340 can be a three-dimensional (3D) full wave solver utilizing BEM based analysis or a hybrid field solver combining a BEM based plane model and transmission line regions. The field solver 340 may generate the signaling net model 302 as a set of scattering parameters (S-Parameters) for the signaling net in the cropped portion of the layout design. By generating termination structures with approximately matching impedances for the artificial boundaries and then generating integral forms of Maxwell's equations, the field solver 340 can generate the signaling net model 302 that removes artificial signal reflections that would have been present due to the artificial boundaries.

Figure 7:
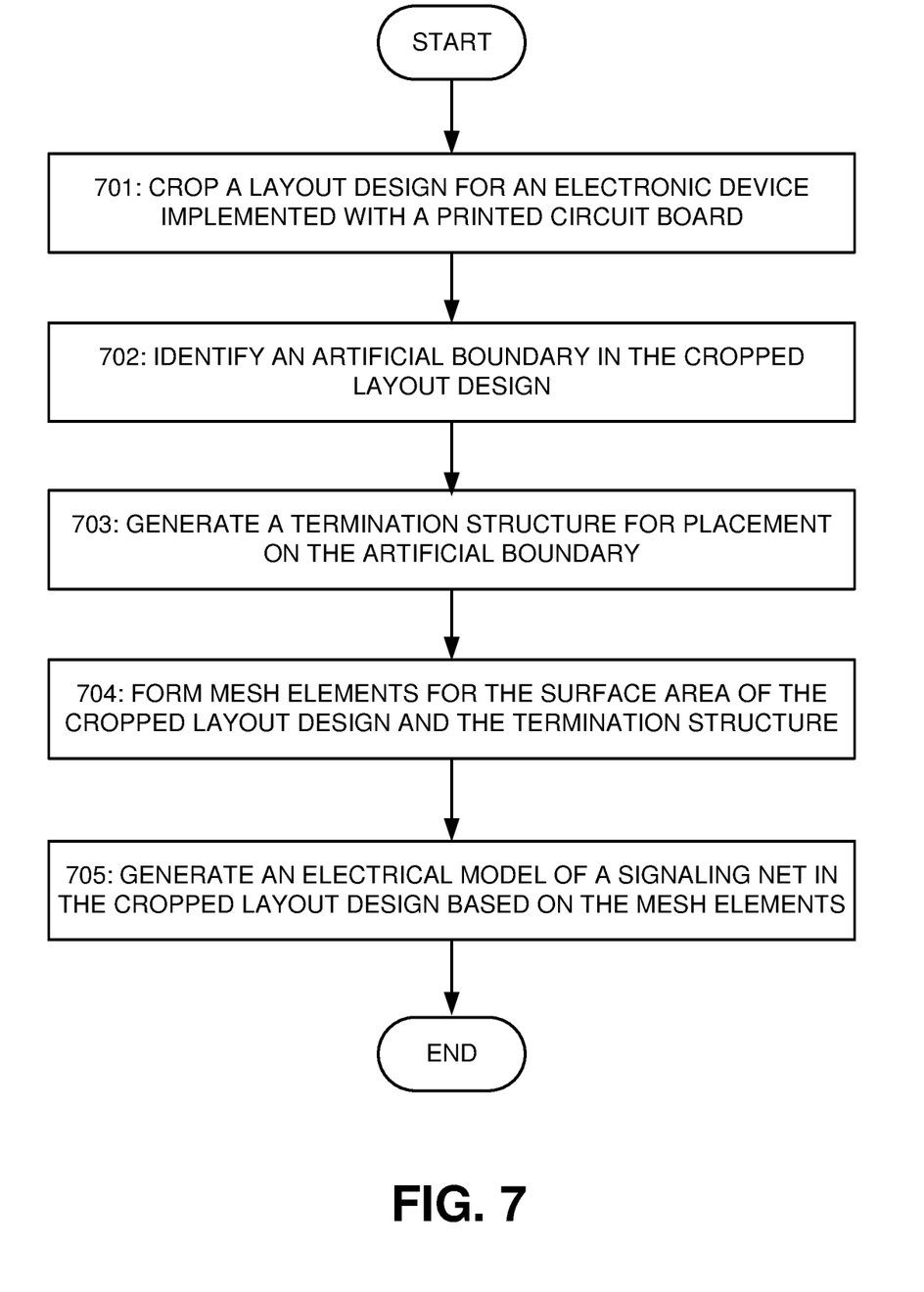
FIG. 7 illustrate a flowchart showing example generation of an electrical model for a signaling net in a cropped portion of a layout design utilizing a termination structure on an artificial boundary according to various examples.

FIG. 7 illustrate a flowchart showing example generation of an electrical model for a signaling net in a cropped portion of a layout design utilizing a termination structure on an artificial boundary according to various examples. Referring to FIG. 7, in a block 701, a computing system implementing a signal net modeling tool can crop a layout design for an electronic device implemented with a layered interconnect. The signal net modeling tool can crop the layout design as part of a divide-and-conquer approach to generating an electrical model of a signaling net within the layout design. In some embodiments, the signal net modeling tool can crop the layout design to remove a via of the signaling net from the layout design for conversion into an electrical model.

In a block 702, the computing system implementing the signal net modeling tool can identify an artificial boundary in the cropped layout design. For example, when the signal net modeling tool performs a cropping operation on the layout design, which severed a signaling net or power planes in the layout design, the signal net modeling tool can identify the severed edge of the signaling net or power plane as being associated with the artificial boundary. In some embodiments, the artificial boundary can correspond to a severed or cropped signal plane(s), signal wire(s), a dielectric between signal planes, or the like. In some embodiments, the signal net modeling tool can perform multiple successive cropping operations on the layout design to form the cropped layout design. The signal net modeling tool can track the severed edges or artificial boundaries created during the successive cropping operations.

In a block 703, the computing system implementing the signal net modeling tool can generate a termination structure for placement on the artificial boundary. The signal net modeling tool can determine a characteristic impedance of a parallel-plate waveguide associated with the dielectric materials disposed between a pair of the planes in the cropped layout design. The characteristic impedance can correspond to an impedance encountered by a signal traveling through the parallel-plate waveguide. The signal net modeling tool can generate the termination structure having an impedance that approximately matches the characteristic impedance in the cropped layout design.

In some embodiments, the signal net modeling tool can generate multiple different types of termination structures based on a type of field solver that the signaling net modeling tool utilizes to generate the electrical model of the signaling net in the cropped layout design. For example, when the signaling net modeling tool utilizes a three-dimensional full-wave field solver implementing a BEM based analysis, the signaling net modeling tool can generate a resistive sheet as the termination structure for placement on the artificial boundary. When the signaling net modeling tool utilizes a hybrid field solver implementing a BEM based analysis, the signaling net modeling tool can generate a set of discrete resistive components as the termination structure for placement on the artificial boundary.

In a block 704, the computing system implementing the signal net modeling tool can form mesh elements for the surface area of the cropped layout design and the termination structure. The mesh elements can correspond to geometric shapes, such as rectangles, squares, triangles, or the like, on the surface area of the cropped layout design and the termination structure. The signal net modeling tool also can generate integral forms of Maxwell's equations for each mesh element or for each edge between the mesh elements.

In a block 705, the computing system implementing the signal net modeling tool can generate an electrical model of a signaling net in the cropped layout design based on the mesh elements. The signal net modeling tool can include a field solver to generate the electrical model of the signaling net in the cropped layout design by solving the integral forms of Maxwell's equations corresponding to the mesh elements utilizing a Boundary Element Method (BEM) based analysis. In some embodiments, the field solver can be a three-dimensional full wave solver utilizing BEM based analysis or a hybrid field solver combining a BEM based plane model and transmission line regions. The field solver may generate the electrical model of the signaling net as a set of scattering parameters for the signaling net in the cropped layout design. By generating a termination structure with an approximately matched impedance for the artificial boundary and then generating integral forms of Maxwell's equations, the field solver can generate the electrical model of the signaling net, which removes artificial signal reflections that would have been present due to the artificial boundary.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims. For example, while some of the specific terminology has been employed above to refer to electronic design automation processes, it should be appreciated that various examples of the invention may be implemented using any electronic system.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
cropping, by a computing system, a layout design for an electronic device implemented with a layered interconnect;
placing, by the computing system, a termination structure on an artificial boundary corresponding to an edge in the cropped portion of the layout design, wherein the termination structure has an impedance corresponding to a characteristic impedance of a parallel-plate waveguide disposed between layers in the layered interconnect; and
generating, by the computing system, an electrical model of a signaling net in the cropped portion of the layout design based, at least in part, on the termination structure on the artificial boundary.

2. The method of claim 1, wherein generating the electrical model of the signaling net further comprises:
generating mesh elements on a surface area of the cropped portion of the layout design and the termination structure, wherein each mesh element describes the corresponding portion of the surfaces area with at least one integral form of Maxwell's equations; and
utilizing a field solver implementing a Boundary Element Method (BEM) based analysis to solve the integral form of the Maxwell's equations, which generates the electrical model of the signaling net in the cropped portion of the layout design.

3. The method of claim 2, wherein the electrical model of the signaling net in the cropped portion of the layout design includes a set of scattering parameters (S-Parameters) for the signaling net in the cropped portion of the layout design.

4. The method of claim 1, further comprising generating, by the computing system, the termination structure for placement in the cropped portion of the layout design based, at least in part, on the characteristic impedance of the parallel-plate waveguide disposed between layers in the layered interconnect.

5. The method of claim 4, wherein the termination structure corresponds to a resistive sheet having the impedance corresponding to the characteristic impedance of the parallel-plate waveguide disposed between layers in the layered interconnect, and having a conductivity dependent based, at least in part, on a frequency of the signal.

6. The method of claim 4, wherein generating the termination structure further comprises dividing planes corresponding to at least one power distribution net terminating at the artificial boundary into multiple transmission lines, and generating the termination structure based on characteristic impedances of the transmission lines.

7. The method of claim 6, wherein the termination structure corresponds to a set of resistive components coupled between plates of the power distribution net in the cropped portion of the layout design.

8. An apparatus comprising at least one computer-readable memory device storing instructions configured to cause one or more processing devices to perform operations comprising:
cropping a layout design for an electronic device implemented with a layered interconnect;
placing a termination structure on an artificial boundary corresponding to an edge in the cropped portion of the layout design, wherein the termination structure has an impedance corresponding to a characteristic impedance of a parallel-plate waveguide disposed between layers in the layered interconnect; and
generating an electrical model of a signaling net in the cropped portion of the layout design based, at least in part, on the termination structure on the artificial boundary.

9. The apparatus of claim 8, wherein generating the electrical model of the signaling net further comprises:
generating mesh elements on a surface area of the cropped portion of the layout design and the termination structure, wherein each mesh element describes the corresponding portion of the surfaces area with at least one integral form of Maxwell's equations; and
utilizing a field solver implementing a Boundary Element Method (BEM) based analysis to solve the integral form of the Maxwell's equations, which generates the electrical model of the signaling net in the cropped portion of the layout design.

10. The apparatus of claim 9, wherein the electrical model of the signaling net in the cropped portion of the layout design includes a set of scattering parameters (S-Parameters) for the signaling net in the cropped portion of the layout design.

11. The apparatus of claim 8, wherein the instructions are configured to cause one or more processing devices to perform operations further comprising generating the termination structure for placement in the cropped portion of the layout design based, at least in part, on the characteristic impedance of the parallel-plate waveguide disposed between layers in the layered interconnect.

12. The apparatus of claim 11, wherein the termination structure corresponds to a resistive sheet having the impedance corresponding to the characteristic impedance of the parallel-plate waveguide disposed between layers in the layered interconnect, and having a conductivity dependent based, at least in part, on a frequency of the signal.

13. The apparatus of claim 11, wherein generating the termination structure further comprises dividing planes corresponding to at least one power distribution net terminating at the artificial boundary into multiple transmission lines, and generating the termination structure based on characteristic impedances of the transmission lines.

14. The apparatus of claim 13, wherein the termination structure corresponds to a set of resistive components coupled between plates of the power distribution net in the cropped portion of the layout design.

15. A system comprising:
a memory system configured to store computer-executable instructions; and
a computing system, in response to execution of the computer-executable instructions, is configured to:
crop a layout design for an electronic device implemented with a layered interconnect;
place a termination structure on an artificial boundary corresponding to an edge in the cropped portion of the layout design, wherein the termination structure has an impedance corresponding to a characteristic impedance of a parallel-plate waveguide disposed between layers in the layered interconnect; and
generate an electrical model of a signaling net in the cropped portion of the layout design based, at least in part, on the termination structure on the artificial boundary.

16. The system of claim 15, wherein the computing system, in response to execution of the computer-executable instructions, is further configured to:
generate mesh elements on a surface area of the cropped portion of the layout design and the termination structure, wherein each mesh element describes the corresponding portion of the surfaces area with at least one integral form of Maxwell's equations; and utilize a field solver implementing a Boundary Element Method (BEM) based analysis to solve the integral form of the Maxwell's equations, which generates the electrical model of the signaling net in the cropped portion of the layout design.

17. The system of claim 16, wherein the electrical model of the signaling net in the cropped portion of the layout design includes a set of scattering parameters (S-Parameters) for the signaling net in the cropped portion of the layout design.

18. The system of claim 15, wherein the computing system, in response to execution of the computer-executable instructions, is further configured to generate the termination structure for placement in the cropped portion of the layout design based, at least in part, on the characteristic impedance of the parallel-plate waveguide disposed between layers in the layered interconnect.

19. The system of claim 18, wherein the termination structure corresponds to a resistive sheet having the impedance corresponding to the characteristic impedance of the parallel-plate waveguide disposed between layers in the layered interconnect, and having a conductivity dependent based, at least in part, on a frequency of the signal.

20. The system of claim 18, wherein the termination structure corresponds to a set of resistive components coupled between plates of a power distribution net in the cropped portion of the layout design.

* * * * *